US012596053B2

(12) United States Patent
Hao et al.

(10) Patent No.: US 12,596,053 B2
(45) Date of Patent: Apr. 7, 2026

(54) AUTOMATIC SYNCHRONOUS LOADING SYSTEM FOR SPACE STRUCTURE LATTICE

(71) Applicant: XI'AN UNIVERSITY OF ARCHITECTURE & TECHNOLOGY, Xi'an (CN)

(72) Inventors: Jiping Hao, Xi'an (CN); Qiang Xue, Xi'an (CN); Xiaoling Sun, Xi'an (CN); Yuqi Huang, Xi'an (CN)

(73) Assignee: XI'AN UNIVERSITY OF ARCHITECTURE & TECHNOLOGY, Xi'an (CN)

( * ) Notice: Subject to any disclaimer, the term of this patent is extended or adjusted under 35 U.S.C. 154(b) by 284 days.

(21) Appl. No.: 18/377,842

(22) Filed: Oct. 9, 2023

(65) Prior Publication Data

US 2024/0035920 A1     Feb. 1, 2024

Related U.S. Application Data

(63) Continuation of application No. PCT/CN2023/077642, filed on Feb. 22, 2023.

(30) Foreign Application Priority Data

Mar. 2, 2022    (CN) .......................... 202210196510.5

(51) Int. Cl.
*G01M 5/00*            (2006.01)
(52) U.S. Cl.
CPC ................................. *G01M 5/0058* (2013.01)
(58) Field of Classification Search
CPC ........ G01M 3/02; G01M 3/14; G01M 5/0058; G01M 99/00
See application file for complete search history.

(56) References Cited

FOREIGN PATENT DOCUMENTS

| | | | |
|---|---|---|---|
| CN | 2496012 | Y | 6/2002 |
| CN | 1540307 | A | 10/2004 |
| CN | 102759484 | A | 10/2012 |
| CN | 103279142 | A | 9/2013 |
| CN | 103499497 | A | 1/2014 |
| CN | 103969111 | A | 8/2014 |
| CN | 205228807 | U | 5/2016 |
| CN | 111350212 | A | 6/2020 |
| CN | 111707443 | A | 9/2020 |

(Continued)

OTHER PUBLICATIONS

Tieming Hu, Structural test loading methods and equipment, Building structure testing, 2017, pp. 1, 15-18.

*Primary Examiner* — Alexander A Mercado

(74) *Attorney, Agent, or Firm* — Bayramoglu Law Offices LLC

(57)            ABSTRACT

An automatic synchronous loading system for a space structure lattice includes a liquid storage tank filled with loading liquid, where the liquid storage tank is connected with a main liquid inlet pipe and a main liquid outlet pipe; a plurality of branch liquid tanks, where each branch liquid tank is connected to the liquid storage tank, and each branch liquid tank corresponds to at least one loading node; each branch liquid tank is connected with a liquid inlet pipe and a liquid outlet pipe, each liquid inlet pipe is communicated with the main liquid inlet pipe, and each liquid outlet pipe is communicated with the main liquid outlet pipe; and regulator valves, where each liquid inlet pipe and each liquid outlet pipe are connected with the regulator valves.

4 Claims, 3 Drawing Sheets

(56)        References Cited

FOREIGN PATENT DOCUMENTS

| CN | 112378608 A | 2/2021 |
| CN | 215218086 U | 12/2021 |
| CN | 114264558 A | 4/2022 |
| WO | 2022021586 A1 | 2/2022 |

AUTOMATIC SYNCHRONOUS LOADING SYSTEM FOR SPACE STRUCTURE LATTICE

CROSS REFERENCE TO THE RELATED APPLICATIONS

This application is a continuation application of International Application No. PCT/CN2023/077642, filed on Feb. 22, 2023, which is based upon and claims priority to Chinese Patent Application No. 202210196510.5, filed on Mar. 2, 2022, the entire contents of which are incorporated herein by reference.

TECHNICAL FIELD

The present invention relates to the technical field of civil engineering, in particular to an automatic synchronous loading system for a space structure lattice.

BACKGROUND

In the field of civil engineering, a structural mechanical property model test under the action of a static load often needs to be carried out, and current common static load methods include a pile-loading method, a distribution beam method, a hydrostatic pressure method, an airbag loading method, and the like. A large-span space structure is generally a rod system or rod cable structure. In a static load test, a linear load is usually converted into a nodal load, which is mostly planar lattice loading. Therefore, the static load test often has the characteristics of a large quantity of loading points, high total load, and a large coverage area. In addition, in order to truly reproduce the mechanical property of a prototype structure, many load working conditions are required by the test, and a full-span load, a half-span load, a non-uniform load, and the like need to be simulated. Furthermore, magnitudes and directions of acting forces are different under different load working conditions.

A traditional loading method has many drawbacks when being applied to a static load test of a large-span space structure. Pile-loading and mounting a weight or a sand bag is the most common loading method. However, this loading method requires a large number of manual operations and has high labor costs, low loading efficiency, and even potential safety hazards. A distribution beam and hydraulic jack loading method is an efficient loading method, but this loading method requires a large quantity of devices, and a special distribution beam system for a to-be-tested piece is usually required to be designed. As a result, the test costs are high, and the loading control is complex. When multi-point unequal-proportion loading of a space structure is carried out, there is a loading system composed of a tension spring, a rigid disk, a distribution beam, and a jack at present, but the system has the drawbacks of a complex force transport path and difficulty in mounting of a loading device and loading control.

With the development of space structures towards a direction of structural complexity and form diversification, higher requirements are put forwards to a large-span space structure test technology. The traditional static load method cannot meet the following requirement in the case of multiple points: Low cost, safety and high efficiency are achieved while synchronous and accurate loading in different proportions and multiple directions is performed. In order to solve the above problems, the present application provides an automatic synchronous loading system for a space structure lattice. According to the schemes of the present application, synchronous and accurate loading of multiple points in any proportion and in any direction of a space structure can be achieved, and the present application has the characteristics of high universality, safety, high efficiency, flexible load distribution, convenience in operation, and proper costs.

SUMMARY

Provided is an automatic synchronous loading system for a space structure lattice, which comprises: a liquid storage tank, wherein the liquid storage tank is filled with loading liquid, and the liquid storage tank is connected with a main liquid inlet pipe and a main liquid outlet pipe; branch liquid tanks, wherein a quantity of the branch liquid tanks is plural, each of the branch liquid tanks is connected to the liquid storage tank, and each of the branch liquid tanks corresponds to at least one loading point; each of the branch liquid tanks is connected with a liquid inlet pipe and a liquid outlet pipe; each of the liquid inlet pipes is communicated with the main liquid inlet pipe, and each of the liquid outlet pipes is communicated with the main liquid outlet pipe; and regulator valves, wherein each of the liquid inlet pipes and each of the liquid outlet pipes are connected with the regulator valves.

The automatic synchronous loading system for a space structure lattice is arranged by the plurality of branch liquid tanks relative to the liquid storage tank so that each branch liquid tank is communicated with the main liquid inlet pipe connected to the liquid storage tank through the liquid inlet pipe, and each branch liquid tank is further communicated with the main liquid outlet pipe connected to the liquid storage tank through the liquid outlet pipe at the same time. Therefore, the loading liquid in the liquid storage tank is shunted, through the main liquid inlet pipe, to the plurality of liquid inlet pipes connected to the main liquid inlet pipe, and then enters the corresponding branch liquid tanks, thereby achieving loading of the loading point. Furthermore, the loading liquid in the branch liquid tanks can also be gathered to the main liquid outlet pipe through the corresponding liquid outlet pipes and then flows into the liquid storage tank, thereby achieving unloading of the loading point. Due to such arrangement, one liquid storage tank can meet loading and unloading of a plurality of points of a space structure, and the loading liquid in the liquid storage tank can be recycled, thereby saving resources and reducing the loading costs.

Each of the liquid inlet pipes and each of the liquid outlet pipes are each provided with a regulator valve, and liquid feeding or liquid discharging of each branch liquid tank is regulated and controlled through the regulator valves, so as to adjust a weight of each branch liquid tank, which can change a loading gravity of the corresponding loading node. In this way, the whole loading process is not only convenient to operate, low in cost and high in loading efficiency, but also does not need to be manually operated all the time, thereby improving operation safety.

The automatic synchronous loading system for a space structure lattice further comprises a plurality of force sensors; and each of the force sensors is correspondingly connected between each branch liquid tank and the loading node. The force sensor is configured to accurately feed back a gravity of the branch liquid tank under each loading node, so that a load of each loading point is accurately measured, and the structure loading precision is ensured.

the automatic synchronous loading system for a space structure lattice further comprises a main controller, a data acquisition box, and a control box; the data acquisition box and the control box are both connected to the main controller, the force sensors are connected to the data acquisition box, and the regulator valves are connected to the control box; the main controller can send a control instruction to the control box according to data of the force sensors fed back by the data acquisition box, thereby regulating and controlling working states of the regulator valves, so as to achieve loading and unloading of the corresponding loading nodes. Therefore, automatic synchronous loading of the respective loading nodes can be achieved only by setting a target load of each loading point on the main controller, and the loading process does not need be manually operated, so that the operation is safe, and the loading efficiency is high.

The automatic synchronous loading system for a space structure lattice further comprises a transmission bus, the transmission bus is provided with a plurality of branch lines, and each of the branch lines corresponds to the regulator valve and the force sensor on one branch liquid tank. Due to such arrangement, each loading point corresponds to an independent control channel, so that loading of a space structure under multiple working conditions, such as single-point loading, multi-point loading, and partitioning loading, can be conveniently achieved.

The automatic synchronous loading system for a space structure lattice further comprises a guy cable connected to the force sensors, and the guy cable is configured to connect the loading nodes.

The automatic synchronous loading system for a space structure lattice further comprises a pulley, and the guy cable connected to the loading nodes is connected to the corresponding force sensors via the pulley. The pulley can change a loading direction to meet a multidirectional loading requirement of the space structure.

The automatic synchronous loading system for a space structure lattice further comprises distribution beams, each of the branch liquid tanks is connected to the loading nodes through the distribution beam, each of the distribution beams corresponds to at least two loading nodes, and the branch liquid tanks are connected to middle portions of the corresponding distribution beams.

A quantity of the loading nodes is plural; any two adjacent loading nodes are taken as one group, one group of the loading nodes is correspondingly connected with one distribution beam, and an interval space is reserved between any two adjacent groups of the loading nodes.

An initial state of mounting of the branch liquid tank relative to the loading node is that the branch liquid tank is in an empty box state.

The main liquid inlet pipe is provided with a main water feed valve, and the main liquid outlet pipe is provided with a main drainage valve; the main liquid inlet pipe is provided with a booster pump, and the main liquid outlet pipe is provided with a drainage pump. The booster pump is configured to ensure a water pressure of each liquid inlet pipe connected with the main liquid inlet pipe and ensure synchronous loading; the drainage pump is configured to quickly return the loading liquid collected in the main liquid outlet pipe to the liquid storage tank.

Figure 1:
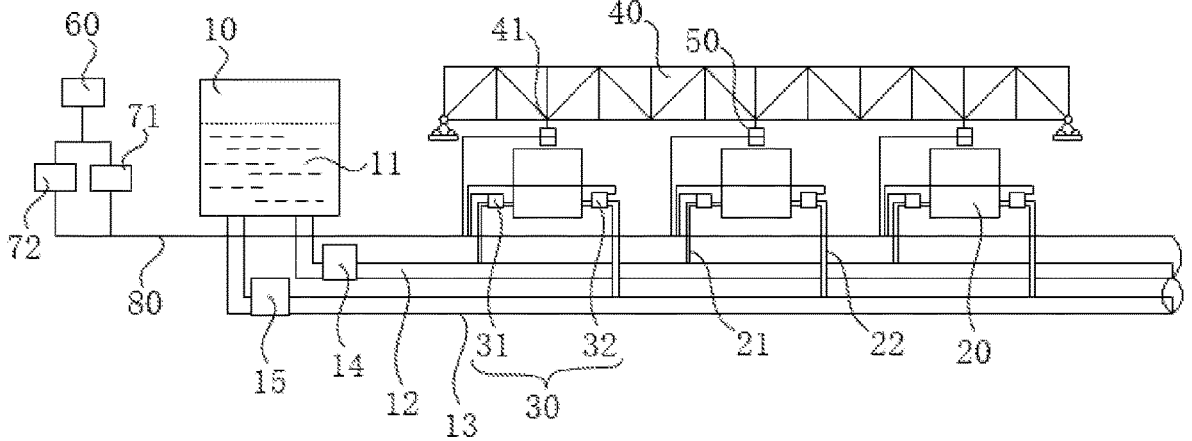
FIG. 1 is a schematic diagram of an automatic synchronous loading system for a space structure lattice provided by an embodiment of the present invention mounted relative to a space structure.

Reference numerals are as follows: 10—a liquid storage tank; 11—loading liquid; 12—a main liquid inlet pipe; 13—a main liquid outlet pipe; 14—a booster pump; 15—a drainage pump; 16—a main water feed valve; 17—a main drainage valve; 20—a branch liquid tank; 21—a liquid inlet pipe; 22—a liquid outlet pipe; 30—a regulator valve; 31—an electromagnetic liquid inlet valve; 32—an electromagnetic liquid outlet valve; 40—a space structure; 41—a loading node; 50—a force sensor; 60—a main controller; 71—a data acquisition box; 72—a control box; 80—a transmission bus; 90—a distribution beam; 100—a guy cable; and 110—a pulley.

DETAILED DESCRIPTION OF THE EMBODIMENTS

In order to make the aforementioned objectives, features, and advantages of the present invention more comprehensible, specific implementations of the present invention are described in detail below in conjunction with the accompanying drawings. In the following description, numerous specific details are set forth in order to provide a thorough understanding of the present invention. However, the present invention may be embodied in many forms different from that described here. Those skilled in the art can make similar improvements without departing from the connotation of the present invention. Therefore, the present invention is not limited by the specific embodiments disclosed below.

In the descriptions of the present invention, it should be understood that orientations or positional relationships indicated by the technical terms "center", "longitudinal", "transverse", "length", "width", "thickness", "upper", "lower", "front", "rear", "left", "right", "vertical", "horizontal", "top", "bottom", "inner", "outer", "clockwise", "anticlockwise", "axial", "radial", "circumferential" and the like are orientations or positional relationships as shown in the drawings, and are only for the purpose of facilitating and simplifying the descriptions of the present invention instead of indicating or implying that devices or elements indicated must have particular orientations, and be constructed and operated in the particular orientations, so that these terms are not construed as limiting the present invention.

In addition, the terms "first" and "second" are used for descriptive purposes only and are not to be construed as indicating or implying relative importance or to implicitly indicate the number of technical features indicated. From this, features defined as "first" and "second" may explicitly or implicitly include at least one feature. In the description of the present invention, "plurality" means at least two, for example, two and three, unless otherwise expressly and specifically limited.

In the present invention, unless otherwise expressly specified and limited, the terms "mount", "connect", "connection", "fix", and the like should be understood in a broad sense, such as, a fixed connection, a detachable connection, an integrated connection, a mechanical connection, an electrical connection, a direct connection, an indirect connection through an intermediate medium, an internal communication of two elements, or interaction between two elements, unless otherwise expressly limited. For those of ordinary skill in the art, the specific meanings of the aforementioned terms in the present invention can be understood according to specific conditions.

In the present invention, unless otherwise expressly specified and limited, the first feature "on" or "below" the second feature may include that the first and second features are in direct contact, or may include that the first and second features are in indirect contact through an intermediate medium. In addition, the first feature "on", "above", or "over" the second feature may include that the first feature is directly or diagonally above the second feature, or merely indicates that a level of the first feature is higher than that of the second feature. The first feature "below", "beneath", and "under" the second feature may include that the first feature is directly or diagonally below the second feature, or merely indicates that a level of the first feature is less than that of the second feature.

It should be noted that when an element is referred to as being "fixed to" or "arranged to" another element, the element can be directly on another component or there can be a centered element. When an element is considered to be "connected" to another element, the element can be directly connected to another element or there may be a centered element. The terms "vertical", "horizontal", "up", "down", "left", "right", and similar expressions used herein are for illustrative purposes only and do not necessarily represent the only implementation.

Figure 5:
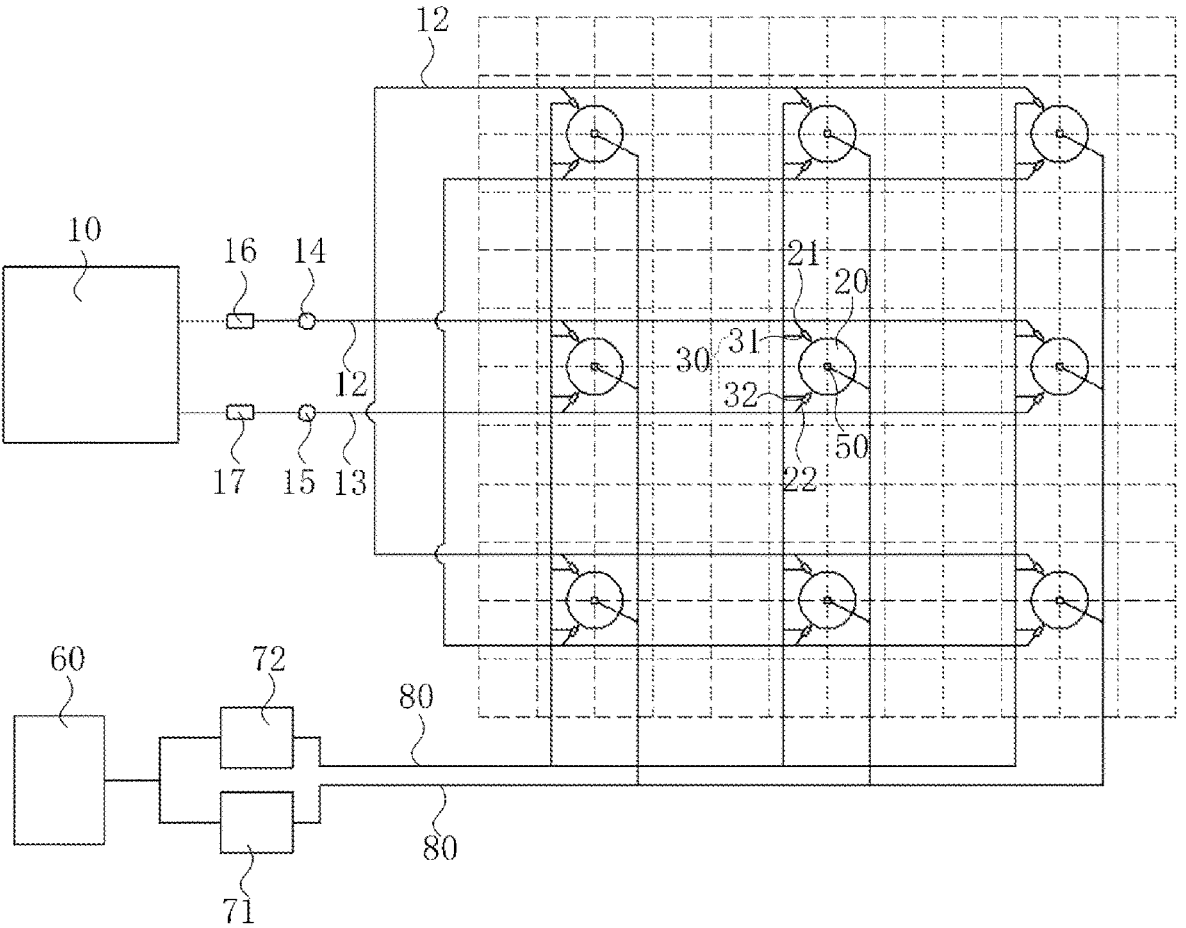
FIG. 5 is a top view of an automatic synchronous loading system for a space structure lattice provided by an embodiment of the present invention mounted relative to a space structure.

As shown in FIGS. 1 and 5, an automatic synchronous loading system for a space structure lattice provided according to an embodiment of the present invention comprises a liquid storage tank 10, branch liquid tanks 20, and regulator valves 30. The liquid storage tank 10 is filled with loading liquid 11, and the liquid storage tank 10 is connected with a main liquid inlet pipe 12 and a main liquid outlet pipe 13. A quantity of the branch liquid tanks 20 is plural, each branch liquid tank 20 is connected to the liquid storage tank 10, and each branch liquid tank 20 corresponds to at least one loading node 41. Each branch liquid tank 20 is connected with a liquid inlet pipe 21 and a liquid outlet pipe 22, each liquid inlet pipe 21 is communicated with the main liquid inlet pipe 12, each liquid outlet pipe 22 is communicated with the main liquid outlet pipe 13, and each liquid inlet pipe 21 and each liquid outlet pipe 22 are connected with the regulator valves 30.

Specifically, the loading node 41 here refers to a position, configured to carry out a load loading test, on a space structure 40. The liquid storage tank 10 is configured to store the loading liquid 11, and the branch liquid tank 20 is configured to be connected to the loading node 41 on the space structure 40. In actual use, the loading liquid 11 in the liquid storage tank 10 flows out along the main liquid inlet pipe 12, then is shunted to a plurality of liquid inlet pipes 21 connected to the main liquid inlet pipe 12, and flows into the corresponding branch liquid tanks 20 through the liquid inlet pipes 21, so that the loading liquid 11 in the liquid distribution tank 20 is added, to achieve loading of a load of the branch liquid tanks 20 acting on the loading node 41. Meanwhile, the loading liquid 11 in each branch liquid tank 20 can flow to the main liquid outlet pipe 13 along the corresponding liquid outlet pipe 22, and thus flow into the liquid storage tank 10 along the main liquid outlet pipe 13. Moreover, switching on of both the liquid outlet pipe 22 and the liquid inlet pipe 21 can be adjusted by the regulator valves 30, thereby satisfying liquid feeding and liquid discharging of the branch liquid tank 20, so as to adjust an amount of the loading liquid 11 in the branch liquid tank 20, namely, to adjust an overall gravity of the branch liquid tank 20 and thus adjust the loading load at the corresponding loading node 41. That is, compared with the loading method in the prior art, the automatic synchronous loading system for a space structure lattice provided by the present invention achieves static loading in a manner of adjusting a gravity of the liquid, and in the loading process, a loaded gravity of the corresponding loading node 41 can be changed by adjusting liquid feeding and discharging conditions in each branch liquid tank 20 through the corresponding regulator valves 30, so that the whole loading process is not only convenient to operate, high in loading efficiency and low in cost, but also does not need to be manually operated all the time, thereby improving operation safety.

It should be added that an initial state of mounting of the branch liquid tank 20 relative to the loading node 41 is that the branch liquid tank 20 is in an empty box state, that is, the branch liquid tank 20 has no loading liquid 11. Due to such arrangement, it is convenient to mount the branch liquid tanks 20 at the loading nodes 41. Furthermore, a gravity of each branch liquid tank 20 is the same, so that at the beginning of the mounting, a stress at each loading node 41 is uniform, which is convenient for subsequent loading regulation and control.

As shown in FIGS. 1 and 5, in some embodiments, the automatic synchronous loading system for a space structure lattice further comprises a plurality of force sensors 50, and each force sensor 50 is correspondingly connected between each branch liquid tank 20 and the loading node 41. Specifically, the gravity of each branch liquid tank 20 can be detected through the force sensor 50, so that a load loaded to the loading node 41 can be obtained, and an operator can adjust the amount of the loading liquid 11 in the branch liquid tank 20 according to an actual load need to ensure the loading precision.

As shown in FIGS. 1 and 5, in some embodiments, the regulator valve 30 adopts an electromagnetic valve. The automatic synchronous loading system for a space structure lattice further comprises a main controller 60, a data acquisition box 71, and a control box 72. The data acquisition box 71 and the control box 72 are both connected with the main controller 60. The force sensors 50 are connected to the data acquisition box 71. The regulator valves 30 are connected to the control box 72. The main controller 60 can regulate and control working states of the regulator valves 30 through the control box 72 according to data of the force sensors 50 fed back by the data acquisition box 71.

Specifically, the electromagnetic valves are convenient for an operator to perform remote control, that is, opening and closing of the electromagnetic valves can be achieved through electrical signals. For convenience of description, the regulator valves 30 on the liquid inlet pipes 21 are used electromagnetic liquid inlet valves 31, and the regulator valves 30 on the liquid outlet pipes 22 are electromagnetic liquid outlet valves 32. That is, in actual use, the operator controls, through the main controller 60, a plurality of electromagnetic liquid inlet valves 31 mounted on the liquid inlet pipes 21 of the different branch liquid tanks 20 to be opened, so that the loading liquid 11 in the liquid storage tank 10 can be shunted into the plurality of different branch liquid tanks 20. Meanwhile, the force sensors 50 always detect the gravities of the corresponding branch liquid tanks 20 and can convert detected gravity signals into current signals or wireless signals and transmit the current signals or the wireless signals to the data acquisition box 71. The data acquisition box 71 transmits the signals to the main controller 60, and the main controller 60 can compare the signals with preset signals for analysis. When the signals received by the main controller 60 are the same as the preset signals, the main controller 60 can control the corresponding electromagnetic liquid inlet valves 31 to be closed, so that the load loading at the loading nodes 41 is achieved. Moreover, when the loads of the loaded branch liquid tanks 20 need to be adjusted, the main controller 60 controls the electromagnetic liquid outlet valves 32 on the corresponding branch liquid tanks 20 to be opened, so that the loading liquid 11 in the corresponding branch liquid tanks 20 flows to the main liquid outlet pipe 13 along the liquid outlet pipes 22 and then flows into the liquid storage tank 10. In this process, the force sensors 50 always detect the gravities of the branch liquid tanks 20 and transmit the detected signals to the data acquisition box 71, the data acquisition box 71 transmits the signals to the main controller 60, and the main controller 60 analyzes and judges the signals. When the signals are the same as an input load signal, the main controller 60 controls the corresponding electromagnetic liquid outlet valves 32 to be closed, so that the loads at the loading nodes 41 are adjusted.

As shown in FIGS. 1 and 5, in some embodiments, the automatic synchronous loading system for a space structure lattice further comprises a transmission bus 80, the transmission bus 80 is provided with a plurality of branch lines, and each branch line corresponds to the regulator valve 30 and the force sensor 50 on one branch liquid tank 20. That is, the branch lines can be configured to correspondingly control the regulator valves 30 on each branch liquid tank 20 and acquire information of the force sensor 50. The transmission bus 80 is configured to facilitate gather the plurality of branch lines and be connected to the main controller 60. Due to cooperation between the branch lines and the transmission bus 80, the single main controller 60 can control the electromagnetic liquid inlet valves 31 and the electromagnetic liquid outlet valves 32 on a plurality of branch liquid tanks 20 and acquire the information of the force sensors 50, so that devices required by the control are reduced, a control system is simplified, and the costs are reduced. That is, the automatic synchronous loading system for a space structure lattice provided in this embodiment can control the loads of the branch liquid tanks 20 at different positions of different partitions by using one network cable (i.e., the transmission bus 80), thereby effectively alleviating the problems of intensive cables and a need for a large number of wires in a test system.

As shown in FIGS. 1 and 5, in some embodiments, a main water feed valve is arranged on the main liquid inlet pipe 12, and a main drainage valve is arranged on the main liquid outlet pipe 13; the main liquid inlet pipe 12 is provided with a booster pump 14, and the main liquid outlet pipe 13 is provided with a drainage pump 15. Specifically, the main water feed valve is configured to control switching on and switching off of the main liquid inlet pipe 12 and control the liquid loading 11 in the liquid storage tank 10 to flow to the branch liquid tanks 20, and cooperates with the booster pump 14 on the main liquid inlet pipe 12 to supply power of the flowing of the loading liquid 11. The main drainage valve is configured to control switching on and switching off of the main liquid outlet pipe 13 and control the liquid loading 11 in the branch liquid tanks 20 to flow to the liquid storage tank 10, and cooperates with the drainage pump 15 on the main liquid outlet pipe 13 to supply power of the backflow of the loading liquid 11.

As shown in FIGS. 1 and 5, in some embodiments, the automatic synchronous loading system for a space structure lattice further comprises a human-computer interaction operation terminal connected to the main controller 60. Generally, the human-computer interaction operation terminal is a computer. In conclusion, the entire automatic synchronous loading system for a space structure lattice has three stages of wiring schemes when performing operation control. The first stage is between the computer and the main controller 60 to run control software. The second stage is an electrical cabinet distributed on a loading site and used for signal convergence and power supplying; and the third stage is control elements arranged on circumferential sides of the liquid storage tank 10 and the branch liquid tanks 20. The first stage and the second stage are connected in series by an Ether Control Automation Technology (EtherCAT) bus, and a maximum distance between any two second-stage electrical cabinets is 80 meters; the second stage and the third stage are connected by a multi-core signal wire; and in order to reduce the interference of analog signals, control wires of the regulator valves 30 and control wires of the force sensors 50 are respectively gathered. That is, the main controller 60 is connected to second-stage electrical cabinets (namely, the electrical cabinets in the second stage) through the Ether-CAT bus, and any two adjacent second-stage electrical cabinets are connected through the EtherCAT bus; and by using the multi-core signal wire, the second-stage electrical cabinets lead out tension signals of the force sensors 50 for convergence and lead out valve control signals of the regulator valves 30 for convergence. A plurality of regulator valves 30 and the plurality of force sensors 50 can be shunted through a deconcentrator. Each force sensor 50 is connected to the deconcentrator through a signal-channel transmitter. The signal-channel transmitter is functioned to convert the signal of the force sensor 50 into an analog signal of 4 mA to 20 mA, and the analog signal is transmitted to the data acquisition box in the electrical cabinet after being converged by the deconcentrator; each regulator valve is connected to the deconcentrator and is connected to the control box in the electrical cabinet through a relay after being gathered. Due to the above arrangement, the interference caused by long wire transmission of analog signals can be reduced, and the cable costs and the site operation difficulty are reduced.

Figure 2:
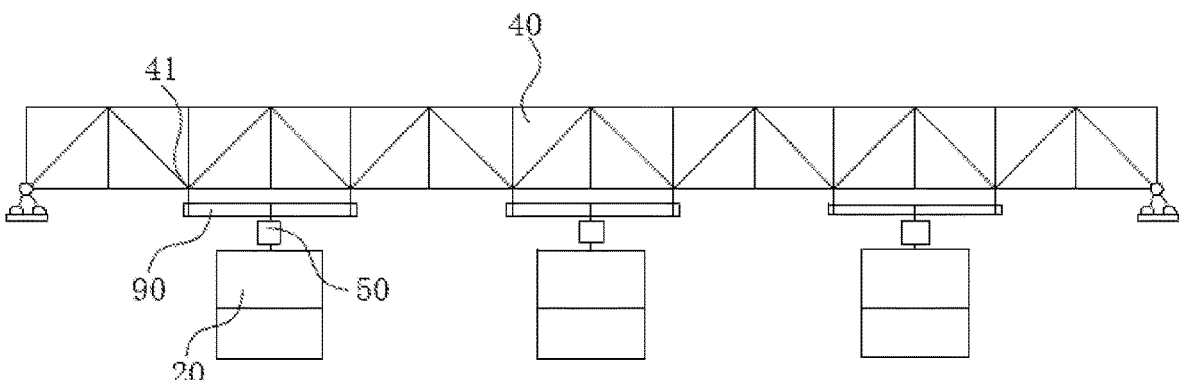
FIG. 2 is a first partially schematic diagram of an automatic synchronous loading system for a space structure lattice provided by an embodiment of the present invention mounted relative to a space structure.

As shown in FIG. 2, in some embodiments, the automatic synchronous loading system for a space structure lattice further comprises distribution beams 90, each branch liquid tank 20 is connected to the loading nodes 41 through the distribution beam 90, each distribution beam 90 corresponds to at least two loading nodes 41, and the branch liquid tanks 20 are connected to middle portions of the corresponding distribution beams 90. Specifically, the distribution beam 90 can be configured to gather at least two loading nodes 41 to share one branch liquid tank 20. At this time, the at least two loading nodes 41 corresponding to the distribution beam 90 should be uniformly distributed relative to the distribution beam 90, and the branch liquid tank 20 corresponding to the distribution beam 90 is also required to be located at a uniformly stressed position, so as to ensure that the load acting on each loading node 41 is convenient to control and distribute. In addition, such arrangement is equivalent to reducing the quantity of the branch liquid tanks 20, which further simplifies the structure and reducing the structural costs.

As shown in FIG. 2, in some embodiments, a quantity of the loading nodes 41 is plural. Any two adjacent loading nodes 41 are taken as one group, one group of the loading nodes 41 is correspondingly connected to one distribution beam 90, and an interval space is reserved between any two adjacent groups of the loading nodes 41. Specifically, taking FIG. 2 as an example, it is assumed that there are six loading nodes 41, the first and second loading nodes form a group, the third and fourth loading nodes form a group, and the fifth and sixth loading nodes form a group. Three groups in total are formed, which correspond to three distribution beams 90. The interval space is reserved between the second and third loading nodes, and the interval space is reserved between the fourth and fifth loading nodes, so that there is no distribution beam 90. Due to such arrangement, the quantity of the branch liquid tanks 20 is correspondingly reduced while the load distributed to each loading node 41 is satisfied, so that the costs are reduced. Moreover, after the quantity of the branch liquid tanks 20 is reduced, corresponding structures such as the regulator valves 30 are also reduced, which also correspondingly improves the operation efficiency. The two loading nodes 41 are distributed at two ends of the corresponding distribution beam 90, and the branch liquid tank 20 is connected to a middle portion of the distribution beam 90, so that it is ensured that the load of the branch liquid tank 20 can be uniformly distributed to the two loading nodes 41, and the loads of the two loading nodes 41 are the same. Of course, one distribution beam 90 may also correspond to three loading nodes 41, and the load distributed to each loading node 41 is one third of the load of the corresponding branch liquid tank 20.

Figure 3:
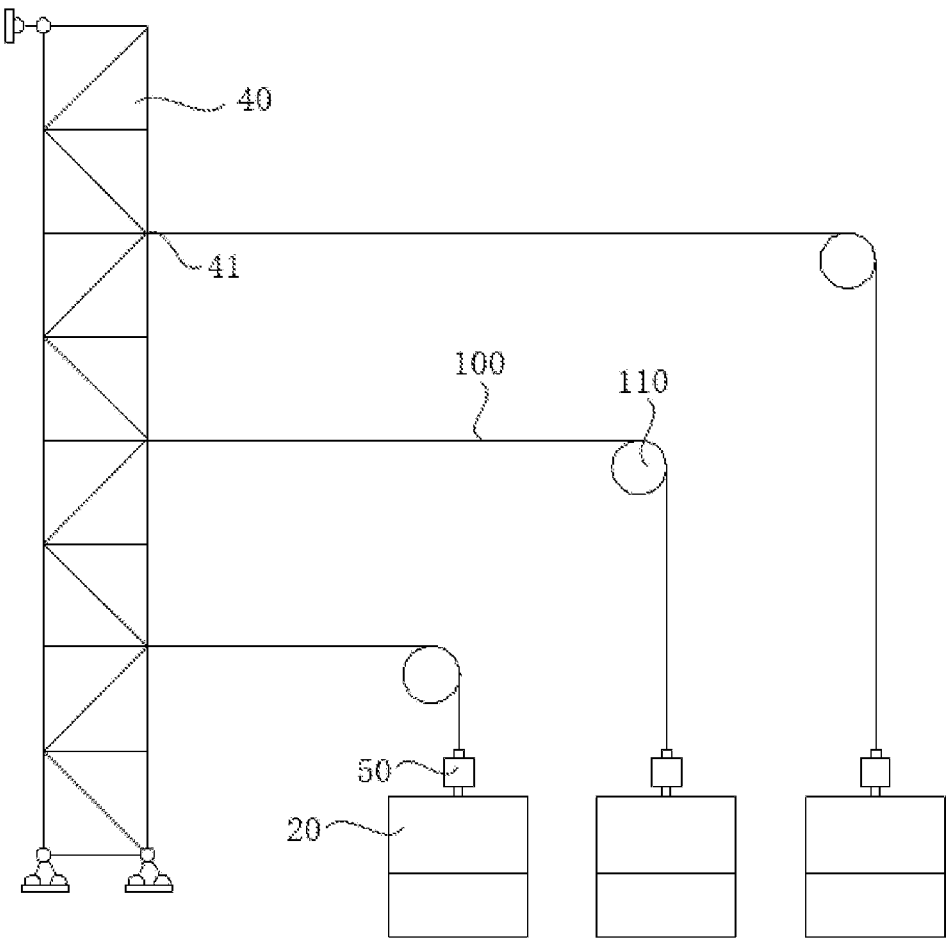
FIG. 3 is a second partially schematic diagram of an automatic synchronous loading system for a space structure lattice provided by an embodiment of the present invention mounted relative to a space structure.
Figure 4:
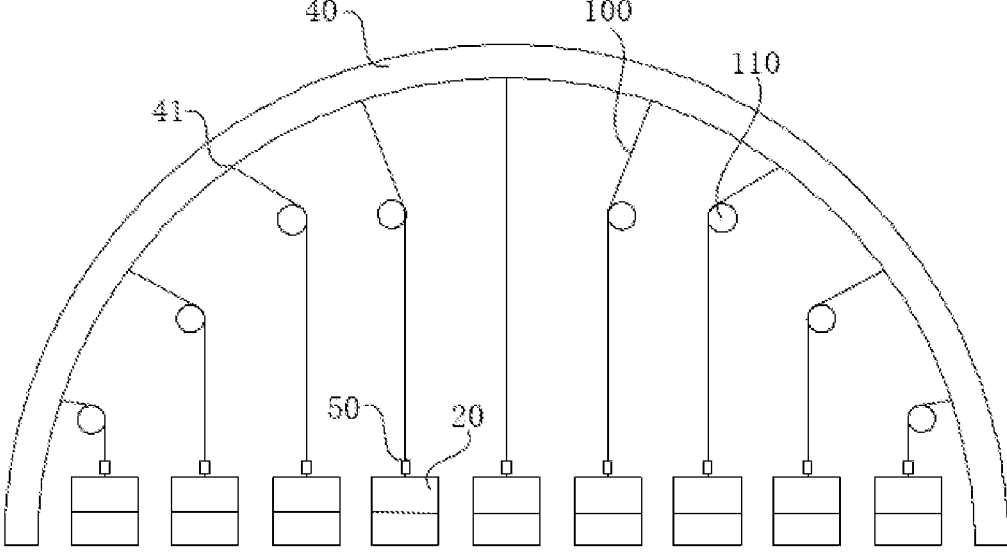
FIG. 4 is a third partially schematic diagram of an automatic synchronous loading system for a space structure lattice provided by an embodiment of the present invention mounted relative to a space structure.

As shown in FIGS. 3 and 4, in some embodiments, the automatic synchronous loading system for a space structure lattice further comprises a guy cable 100 connected to the force sensors 50, and the guy cable 100 is configured to connect the loading nodes 41 or the distribution beams 90. That is, in this embodiment, the distribution beam 90 is connected to two loading nodes 41 on the space structure 40 through the guy cable 100, and then the force sensor 50 is connected to the middle portion of the distribution beam 90 through the guy cable 100, so as to be connected to the branch liquid tank 20. That is, the guy cable 100 is primarily functioned to achieve connection and loading.

As shown in FIGS. 3 and 4, in some embodiments, the automatic synchronous loading system for a space structure lattice further comprises a pulley 110, the guy cable 100 connected to the loading nodes 41 is connected to the corresponding force sensor 50 through the pulley 110, and the pulley 110 is configured to change an extending direction of the guy cable 100. Specifically, in a normal case, after the force sensor 50 and the branch liquid tank 20 are connected by the guy cable 100, a force direction of the guy cable 100 is a gravity direction of the branch liquid tank 20, so that a direction of a force loaded on the loading nodes 41 is the gravity direction of the branch liquid tank 20. However, when the loading nodes 41 on a certain space structure 40 are not loaded in a vertical direction under some special conditions, the direction of the force needs to be changed, but the magnitude of the force does not need to be changed. At this time, the change can be achieved by cooperation between the pulley 110 and the guy cable 100. The pulley 110 is fixed at a position to form a fixed pulley system. One end of the guy cable 100 is connected to the loading nodes 41 and is connected to the force sensor 50 by bypassing the pulley 110, so that the force sensor 50 is connected to the corresponding branch liquid tank 20. For example, when the space structure 40 is in a vertical state, the guy cable 100 connected to each loading node 41 extends horizontally and is connected to the vertical branch liquid tank 20 through the corresponding pulley 110, so that a horizontal force is transitioned to a vertical force, that is, the direction of the force is changed, without changing the magnitude of the force. For another example, when the space structure 40 is an arch structure, the guy cable 100 corresponding to each loading node 41 can extend first in a radial direction and is then connected to the vertical branch liquid tank 20 through the corresponding pulley 110. That is, the pulley 110 provided in this embodiment can cooperate with the guy cable 100 to form a multi-directional loading system, so as to implement multi-directional loading, such as horizontal loading or antigravity loading.

The various technical features in the foregoing embodiments may be randomly combined. For concise description, not all possible combinations of the various technical features in the above embodiments are described. However, provided that combinations of these technical features do not conflict with each other, the combinations of the various technical features are considered as falling within the scope of this specification.

The foregoing embodiments merely express several implementations of the present invention. The descriptions thereof are relatively specific and detailed, but are not understood as limitations on the scope of the present invention. It should be pointed out that those of ordinary skill in the art can also make several transformations and improvements without departing from the idea of the present invention. These transformations and improvements fall within the protection scope of the present invention. Therefore, the protection scope of the present invention shall be subject to the appended claims.

What is claimed is:

1. An automatic synchronous loading system for a space structure lattice, comprising:

a liquid storage tank, wherein the liquid storage tank is filled with a loading liquid, and the liquid storage tank is connected to a main liquid inlet pipe and a main liquid outlet pipe;

branch liquid tanks, wherein a quantity of the branch liquid tanks is plural, and each of the branch liquid tanks corresponds to at least one loading node; each of the branch liquid tanks is connected to the liquid storage tank, each of the branch liquid tanks is connected with a liquid inlet pipe and a liquid outlet pipe, each of the liquid inlet pipes is communicated to the main liquid inlet pipe, and each of the liquid outlet pipes is communicated to the main liquid outlet pipe;

regulator valves, wherein each of the liquid inlet pipes and each of the liquid outlet pipes are each connected with a respective regulator valve;

a plurality of force sensors, wherein each of the plurality of force sensors is correspondingly connected between a respective one of the branch liquid tanks and a corresponding one of the loading nodes; a quantity of the loading nodes is plural;

a main controller, a data acquisition box, a control box, and a transmission bus;

wherein the data acquisition box and the control box are both connected to the main controller through the transmission bus; the data acquisition box is connected to the plurality of force sensors through a multi-core signal wire, and the control box is connected to the regulator valves through the multi-core signal wire; the main controller is configured, according to data of the plurality of force sensors fed back by the data acquisition box, to compare the signals with preset signals for analysis and, when the signals received by the main controller are the same as the preset signals, to control the corresponding regulator valves on the liquid inlet pipes to be closed, and, when loads of the loaded branch liquid tanks need to be adjusted, to control the regulator valves on the corresponding liquid outlet pipes to be opened and, when the signals are the same as an input load signal, to control the corresponding regulator valves on the liquid outlet pipes to be closed, through the control box;

the transmission bus is provided with a plurality of branch lines, and each branch line corresponds to the regulator valve and the force sensor on one branch liquid tank;

the automatic synchronous loading system for the space structure lattice adopts three stages of wiring schemes, namely a first stage, a second stage, and a third stage; the first stage is between a computer and the main controller and is configured to run control software; the second stage is an electrical cabinet located at a loading site and configured for signal convergence and power supplying; the third stage is control elements arranged on circumferential sides of the branch liquid tanks, and the control elements at least comprise the regulator valves and the plurality of force sensors; the first stage and the second stage are connected in series through an Ether Control Automation Technology (EtherCAT) bus, and the second stage and the third stage are connected through the multi-core signal wire;

by using the multi-core signal wire, the electrical cabinet is configured to lead out signals of the plurality of force sensors for convergence by a deconcentrator and to the data acquisition box, and valve control signals of the regulator valves for convergence by a deconcentrator and to the control box; the regulator valves and the plurality of force sensors are branched by a deconcentrator; each of the plurality of force sensors is connected to the deconcentrator through a single-channel transmitter and is connected to a bus module in the electrical cabinet after the convergence; each of the regulator valves is connected to the deconcentrator and is connected to the bus module in the electrical cabinet after the convergence;

the regulator valves on the liquid inlet pipes are electromagnetic liquid inlet valves, and the regulator valves on the liquid outlet pipes are electromagnetic liquid outlet valves;

a guy cable connected to the plurality of force sensors; wherein the guy cable is configured to be connected to the loading nodes; and a pulley, wherein the guy cable connected to the loading nodes is connected to the corresponding force sensor through the pulley, and the pulley is configured to change an extending direction of the guy cable; when the loading nodes on a certain space structure are not in a normal horizontal state, a direction of a force is changed, without changing a magnitude of the force by a cooperation between the pulley and the guy cable.

2. The automatic synchronous loading system for the space structure lattice according to claim 1, further comprising the distribution beams; wherein each of the distribution beams corresponds to at least two of the loading nodes, the branch liquid tanks are connected to the loading nodes through the distribution beams, and the branch liquid tanks are connected to middle portions of the corresponding distribution beams.

3. The automatic synchronous loading system for the space structure lattice according to claim 1, wherein an initial state of mounting of the branch liquid tanks relative to the loading nodes is that the branch liquid tanks are in an empty box state.

4. The automatic synchronous loading system for the space structure lattice according to claim 1, wherein the main liquid inlet pipe is provided with a main water feed valve, and the main liquid outlet pipe is provided with a main drainage valve; and the main liquid inlet pipe is provided with a booster pump, and the main liquid outlet pipe is provided with a drainage pump.

* * * * *